Dec. 17, 1940.   C. S. CRICKMER   2,225,208
PIPE COUPLING
Filed April 20, 1939
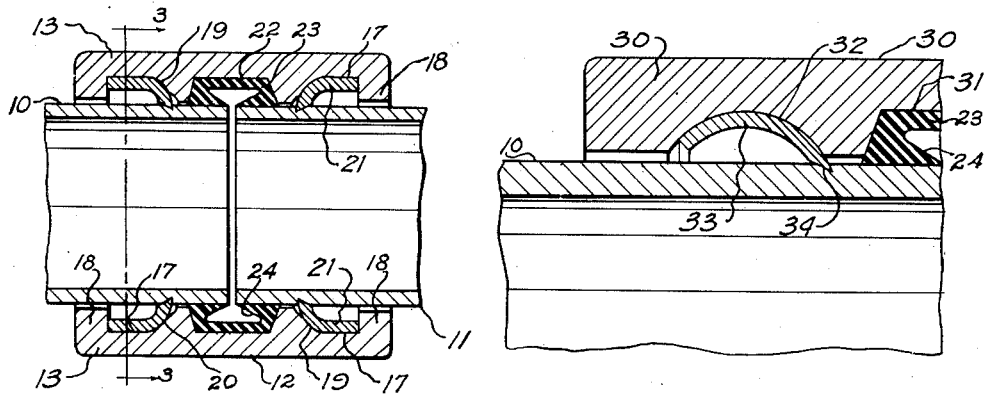
Fig. 1.
Fig. 6.
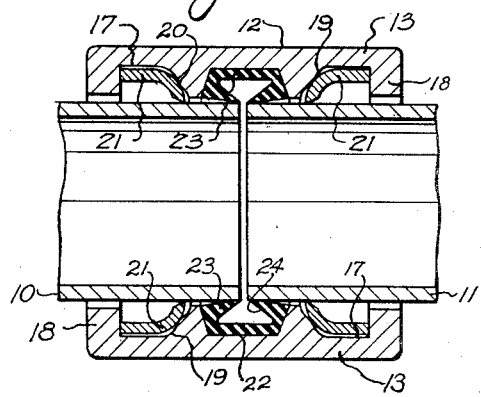
Fig. 2.
Fig. 3.
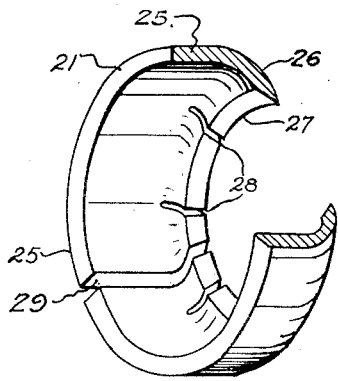
Fig. 4.
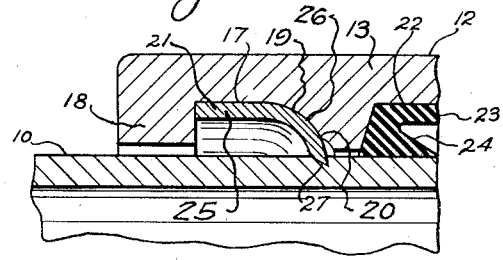
Fig. 5.
Inventor
Charles S. Crickmer
Jack A. Ashley
Attorney Patented Dec. 17, 1940

2,225,208

UNITED STATES PATENT OFFICE 2,225,208

PIPE COUPLING

Charles S. Crickmer, Dallas, Tex., assignor to Merla Tod Company, Dallas, Tex., a firm of Texas Application April 20, 1939, Serial No. 268,924

5 Claims. (Cl. 285—194)

This invention relates to new and useful improvements in pipe couplings.

It has become the practice in the pipe line industry to use a coupling which will permit lateral movement of the coupled pipe sections, or other members, with relation to each other and various types of couplings have been designed. Ordinarily, the pipe sections which are to be connected together are provided with smooth non-screwthreaded ends, the usual procedure being to provide an annular groove near the end of each section. The coupling housing is then fastened around the sections with its ends engaging within the annular grooves. It is undesirable to provide these grooves in the pipe sections, since it weakens said pipe sections and also the expense of manufacture is increased. It has been found preferable to couple the smooth ends of the sections without the use of a groove. However, when the groove is omitted, it has been difficult to prevent the ends of the sections from pulling apart and causing disengagement of the same from the coupling.

Therefore, it is one object of the invention to provide means for coupling pipe sections having smooth non-screwthreaded ends so as to permit lateral movement of the sections with relation to each other and at the same time prevent longitudinal displacement of said sections with relation to each other.

An important object of the invention is to provide an improved pipe coupling having an individual means for gripping each pipe section, whereby longitudinal separation of the pipe sections is prevented and also whereby each section may undergo a limited lateral movement with relation to the coupling.

A particular object of the invention is to provide an improved coupling, of the character described, wherein resilient, annular gripping members are disposed for engagement with the pipe sections, to prevent separation of the sections, together with sealing means surrounding the adjacent ends of the sections and exposed to the fluid within the bore of said sections for packing off around the ends of the coupled sections.

Another object of the invention is to provide an improved coupling having resilient gripping means for engaging pipe sections to be connected, said means being so arranged that it will be forced or moved into tighter engagement with the pipe sections when the same are moved longitudinally away from each other, whereby separation of said sections is prevented.

A construction designed to carry out the invention will be hereinafter described together with other features of the invention.

The invention will be more readily understood from a reading of the following specification and by reference to the accompanying drawing, in which an example of the invention is shown, and wherein:

Figure 1 is a longitudinal, sectional view of a coupling, constructed in accordance with the invention, and fastened in position around a pair of pipe sections, Figure 2 is a similar view of the coupling before tightening, Figure 3 is a transverse, sectional view taken on the line 3—3 of Figure 1, Figure 4 is an isometric view of a portion of one of the gripping members, Figure 5 is an enlarged, sectional view of a portion of the tightened coupling, and Figure 6 is a similar view of a modified form of coupling and gripping member.

In the drawing, the numerals 10 and 11 designate sections of tubular pipe having smooth non-screwthreaded inner and outer surfaces which are adapted to be fastened or connected together by a coupling 12. The coupling includes a cylindrical housing 13 which is split diametrically thereof and which has its two halves formed with complementary, longitudinal flanges 14 so that they may be fastened around the pipe sections by suitable bolts 15 and nuts 16. The internal diameter of the coupling is slightly greater than the external diameter of the pipe sections, whereby an annular clearance is provided between said sections and said coupling when the latter is tightened, as shown in Figure 5.

A pair of internal, annular recesses or grooves 17 are formed within the coupling housing and are located, one adjacent each end thereof, whereby an internal radial flange 18 is provided at each end of said housing. Since the recesses or grooves are identical, a description of one is thought to be sufficient. The bottom and the outer side or end wall of the recess are flat and extend at substantially a right angle to each other as shown in Figures 1 and 2. The inner side or end wall of the recess is curved or arced inwardly toward the axis of the coupling housing as shown at 19 to provide a bevelled surface. An annular ridge or rib 20 is formed on the bevelled surface 19 adjacent its inner peripheral edge, as is clearly shown in Figure 5. Each recess is arranged to receive an annular gripping member 21 of spring steel, or other suitable metal, as will be hereinafter fully explained.

An annular packing groove or recess 22 is provided in the internal surface of the coupling at its central portion intermediate the recesses 17. The side walls of the groove 22 are inclined or flared outwardly and inwardly from the bottom or base of said groove, whereby the mouth of the groove is of greater width than the bottom thereof. A complementary elastic packing ring 23 of rubber, or other suitable resilient material, is arranged to seat within the groove 22 and surround the adjacent ends of the pipe sections to pack off the joint between said sections, as shown in Figure 1. The ring 23 is provided with a pair of internal, annular lips 24 which snugly engage the pipe sections and which form an annular channel within said ring; the channel communicating with the bore of said sections so as to be exposed to the pressure of the fluid conducted by the sections, whereby said ring will be distorted into sealing position within its groove 22.

The annular gripping member 21, which is housed or confined within each of the recesses 17, includes a wide relatively thin annulus or ring 25 which is formed with an integral inwardly-curved or arced flange 26, as is clearly shown in Figure 5. The inner peripheral edge of the flange 26 is tapered or sharpened to form an annular knife-edge 27 and is provided with a plurality of radial slots or recesses 28 which are relatively narrow and which are preferably cut in the annulus prior to the bending or forming of said flange. The provision of these slots makes it possible to vary the inner diameter of the annular knife edge 27 within certain limits for manifestly, the spaces formed by the slots permit the flange 26 to be deformed or pressed inwardly by an exterior pressure. It is pointed out that each gripping member is split radially at 29, as shown in Figure 4, whereby said member may be compressed when the housing is tightened.

In making up the coupling, the gripping members 21 and the packing ring 23 are placed around the adjacent ends of the pipe sections 10 and 11 in the position shown in Figure 2. The housing 13 is then fastened around the pipe sections by means of the bolts 15 and nuts 16 so that the gripping members and packing ring are confined therebetween within the recesses 17 and groove 22, respectively. When it is ascertained that the members 21 and ring 23 are properly positioned, the nuts 16 are tightened on their bolts 15 so as to cause the flanges 14 of the housing to be moved into close proximity. At this time, the packing ring will be moved to the position shown in Figure 1, while the gripping members will be forced into engagement with the pipe sections. Since the gripping members are confined between the housing and the pipe sections, each member will tend to assume or conform to the shape or contour of its recess and, thus, the outer periphery of said member will engage and extend contiguous to the bottom of said recess. Further tightening of the housing will cause the annular ridge 20 of each recess to deform or bow the curved flange 26 of each gripping member inwardly, whereby the knife-edge of said flange will be forced inwardly to engage or bite into the external surface of its respective pipe section (Figure 5). Thus, each section will be positively connected to the housing which acts to couple the sections together.

Obviously, when the coupling and its gripping members are in the position shown in Figure 1, it is impossible for the pipe sections to become separated since an outward longitudinal movement of either of said sections causes its gripping member to more firmly engage the same. The flange 26 of the member will be further deformed by the annular ridge 20, whereby the knife-edge 27 of said flange will bite deeper into the displaced section to prevent further displacement thereof. Thus, continued outward movement of the sections only tightens the connection between the coupling and said sections. However, limited lateral movement of the sections with relation to each other is permitted due to the fact that a slight clearance between the coupling and said sections is provided by the greater internal diameter of said coupling. Therefore, a coupling having an individual gripping member for each pipe section is provided which prevents end or longitudinal displacement of the sections without hindering lateral or transverse displacement of the same. By using this coupling, pipe sections having smooth non-screwthreaded ends may be quickly and efficiently coupled.

In Figure 6, a modified form of coupling is shown and includes a split cylindrical housing 30 which is similar to the housing 13 of the coupling 12. An annular, centrally-disposed packing groove or recess 31, identical to the groove 22, is provided in the internal surface 30 of the housing 30 and is arranged to receive the packing ring 23. An internal, annular recess or groove 32 is also formed within the housing adjacent each end thereof, and each recess is curved or arcuate in cross-section. A complementary split gripping member 33 is adapted to engage within each recess 32 and has one peripheral edge sharpened to form an annular knife-edge 34, whereby the pipe sections may be connected to the housing of the modified coupling. When the housing is tightened, the knife-edges 34 of the gripping members 33 will be forced inwardly to engage or bite into the external surface of the pipe sections, thereby positively coupling said sections together. Due to the curved or arcuate contour of the recess 32 and members 33, a universal or ball and socket connection between the sections and the housing in effect is provided which permits a limited universal movement of said sections with relation to each other.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent, is:

1. A pipe coupling including, a housing adapted to encircle the ends of abutting pipe sections, a packing ring within the housing surrounding the pipe sections for sealing the joint therebetween, and annular resilient gripping members confined within the housing for engaging the outer surfaces of said sections, each member having an inwardly-curved portion which has its inner edge sharpened for engagement with a pipe section, said housing having internal recesses for receiving the members, the recesses being of such contour that they co-act with the curved portions of said members to maintain the sharpened edges thereof in pipe engaging position, whereby longitudinal displacement of said sections is prevented, the single engagement between each member and its pipe section permitting a limited universal movement of said section relative to the other section and said member.

2. A pipe coupling including, a housing adapted to encircle the ends of abutting pipe sections and having a bore of a diameter greater than the external diameter of the pipe sections to provide a clearance therebetween, and a pair of annular resilient gripping members confined within the housing for engaging the outer surfaces of said pipe sections, each member having a sharpened edge for engaging one of the sections and co-acting with said housing so as to be maintained in pipe engaging position, whereby each section is independently connected with the housing and may move laterally with relation to the other section, each member also being split radially so that it may be distorted into engagement with its respective pipe section when the housing is tightened.

3. A pipe coupling including, a housing adapted to encircle the ends of abutting pipe sections and having annular recesses formed in its inner surface, each recess being curved in cross-section, and annular resilient gripping members disposed within the recesses for engaging the outer surface of the pipe sections, each member being complementary to its recess and having a sharpened edge for engaging a pipe section and co-acting with said recess so as to be maintained in pipe engaging position, the complementary contour of the members and recesses presenting substantially a ball and socket connection therebetween, whereby the sections may undergo a limited universal movement with relation to each other and the housing.

4. As a sub-combination in a pipe coupling, an annular gripping member formed of a flexible metallic annulus, the member having a general arcuate shape in cross-section, one end of said member being of less diameter than the other and having its inner peripheral edge tapered to form a knife edge for engaging the external surface of a pipe.

5. As a sub-combination in a pipe coupling, an annular gripping member of relatively thin flexible metal having a longitudinally-extending portion, the member also having an inwardly-curved flange made integral with one end of the longitudinal portion, the inner peripheral edge of the flange being tapered to form an annular knife edge for engaging the external surface of a pipe.

CHARLES S. CRICKMER.

CERTIFICATE OF CORRECTION.

Patent No. 2,225,208. December 17, 1940.

CHARLES S. CRICKMER.

It is hereby certified that error appears in the above numbered patent requiring correction as follows: In the grant, lines 1 and 12, and in the heading to the printed specification, line 2, name of assignee, for "Merla Tod Company" read --Merla Tool Company--; and that the said Letters Patent should be read with this correction therein that the same may conform to the record of the case in the Patent Office.

Signed and sealed this 28th day of January, A. D. 1941.

(Seal)

Henry Van Arsdale,
Acting Commissioner of Patents.